United States Patent
Higgins et al.

(10) Patent No.: US 7,605,341 B2
(45) Date of Patent: Oct. 20, 2009

(54) METERING SYSTEM AND METHOD FOR SUPPLYING GAS TO A TORCH

(75) Inventors: Philip K. Higgins, Florence, SC (US); Wayne Stanley Severance, Jr., Darlington, SC (US)

(73) Assignee: The ESAB Group, Inc., Florence, SC (US)

( * ) Notice: Subject to any disclaimer, the term of this patent is extended or adjusted under 35 U.S.C. 154(b) by 405 days.

(21) Appl. No.: 11/423,237

(22) Filed: Jun. 9, 2006

(65) Prior Publication Data

US 2007/0007258 A1 Jan. 11, 2007

Related U.S. Application Data

(63) Continuation of application No. 10/980,374, filed on Nov. 3, 2004, now Pat. No. 7,115,833.

(51) Int. Cl.
   *B23K 10/00* (2006.01)
(52) U.S. Cl. .................. 219/121.55; 219/121.51; 219/121.54
(58) Field of Classification Search ............ 219/121.48, 219/121.43, 121.54, 121.55, 121.57, 121.59; 315/111.21; 313/231.34
See application file for complete search history.

(56) References Cited

U.S. PATENT DOCUMENTS

| | | | |
|---|---|---|---|
| 3,471,674 A | 10/1969 | Gage | |
| 4,663,515 A | 5/1987 | Kneeland et al. | |
| 5,017,752 A | 5/1991 | Severance, Jr. et al. | |
| 5,023,425 A | 6/1991 | Severance, Jr. | |
| 5,170,033 A | 12/1992 | Couch et al. | |
| 5,294,773 A * | 3/1994 | Lambert | 219/121.54 |
| 5,317,126 A | 5/1994 | Couch, Jr. et al. | |

(Continued)

FOREIGN PATENT DOCUMENTS

DE          DD 55437          5/1967

(Continued)

OTHER PUBLICATIONS

European Search Report for EP Appln. No. 05023749.4 dated Feb. 14, 2007.

*Primary Examiner*—Mark H Paschall
(74) *Attorney, Agent, or Firm*—Alston & Bird LLP

(57) ABSTRACT

A metering system and associated method for supplying gas to a torch are provided. The metering system includes a controller that is configured to adjust a pressure regulator according to the pressure and flow rate of the gas delivered to the torch. For example, the torch can be a plasma arc torch that has an electrode positioned in a nozzle and operates in a working mode by providing an arc from the electrode to a workpiece. In a first mode of operation, the metering system can provide a gas to the torch by adjusting the pressure regulator according to the pressure downstream of the pressure regulator. In a second mode of operation, the metering system can provide adjust the pressure regulator according to the flow rate of the gas through a flow transducer in series with the pressure regulator. Further, the metering system can be configured to monitor the downstream pressure and the flow rate of the gas and determine therefrom whether there exists in the torch a double arc or other operating condition that affects the flow of the gas through the nozzle.

17 Claims, 2 Drawing Sheets

U.S. PATENT DOCUMENTS

Figure 1:
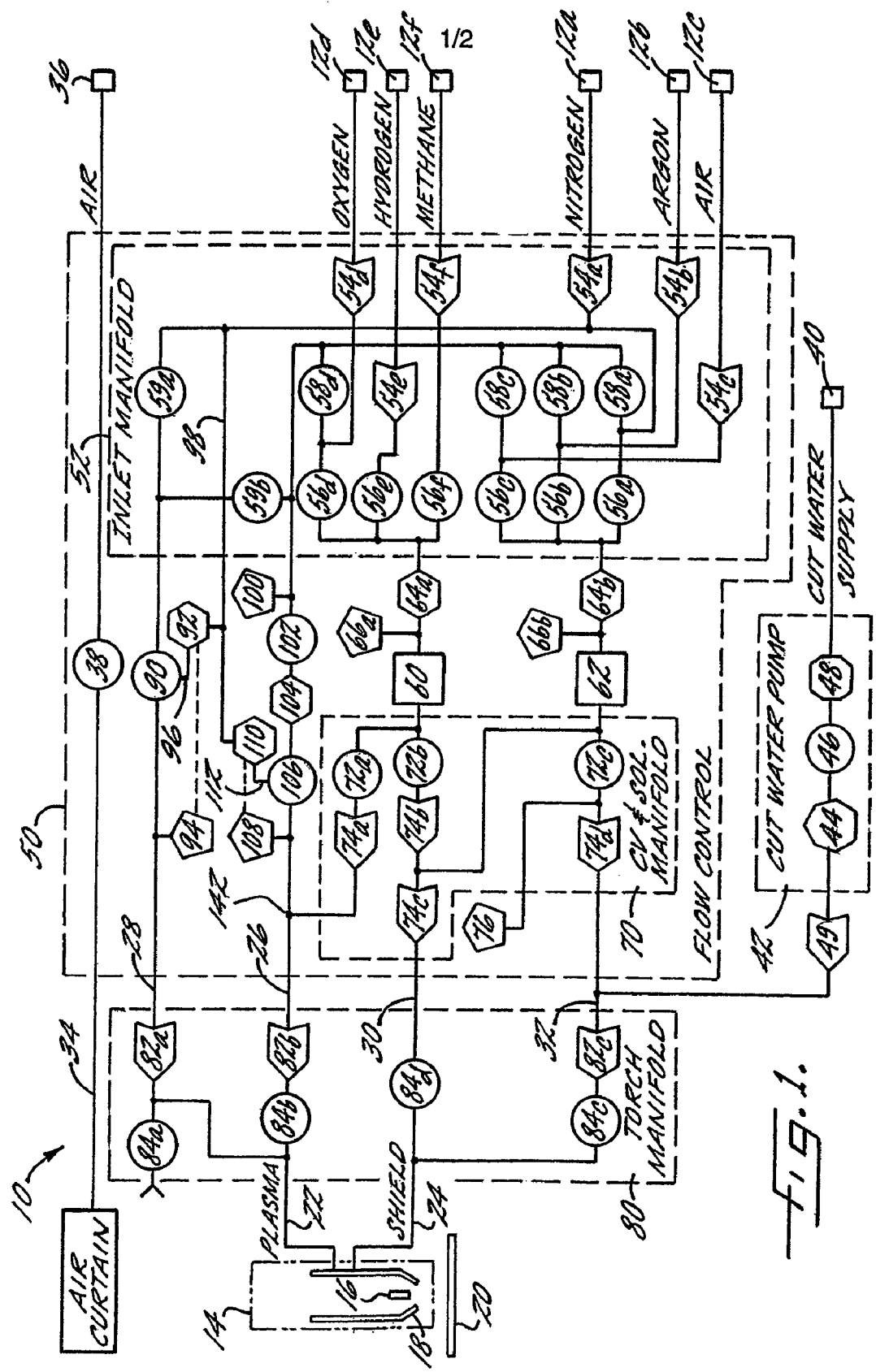

| | | |
|---|---|---|
| 5,491,321 A | 2/1996 | Stuart et al. |
| 5,550,344 A | 8/1996 | Winterfeldt |
| 5,961,855 A | 10/1999 | Hewett et al. |
| 6,121,570 A | 9/2000 | Oakley et al. |
| 6,206,878 B1 | 3/2001 | Bishop et al. |
| 6,215,090 B1 | 4/2001 | Severance, Jr. et al. |
| 6,232,575 B1 | 5/2001 | Oakley et al. |
| 6,248,972 B1 | 6/2001 | Yamaguchi |
| 6,359,251 B1 | 3/2002 | Picard et al. |
| 6,670,572 B2 | 12/2003 | Norris et al. |
| 2003/0034334 A1 | 2/2003 | Furujo |
| 2004/0094520 A1 | 5/2004 | Nemchinsky |
| 2005/0045600 A1 | 3/2005 | Tatham |
| 2006/0186094 A1 | 8/2006 | Krink et al. |

FOREIGN PATENT DOCUMENTS

| | | |
|---|---|---|
| DE | DD 132247 | 9/1978 |
| DE | 195 36 150 | 4/1997 |
| DE | 201 21 641.8 | 3/2003 |
| EP | 0 697 935 | 4/1999 |
| EP | 1 284 169 | 2/2003 |
| JP | 10 263827 | 10/1998 |
| WO | WO 2005/007332 | 1/2005 |

* cited by examiner

METERING SYSTEM AND METHOD FOR SUPPLYING GAS TO A TORCH

CROSS REFERENCE TO RELATED APPLICATIONS

This application is a continuation of U.S. patent application Ser. No. 10/980,374, filed Nov. 3, 2004, now U.S. Pat. No. 7,115,833 which is hereby incorporated herein in its entirety by reference.

BACKGROUND OF THE INVENTION

1) Field of the Invention

The invention relates to the supply of a gas to a torch such as a plasma arc torch and, more particularly, to a system and method for controlling the flow of the gas according to the operating parameters of the torch.

2) Description of Related Art

Plasma arc devices are commonly used for cutting and welding. One conventional plasma arc torch includes an electrode positioned within a nozzle. A pressurized gas is supplied to the torch and flows through the nozzle and proximate to the torch, and an arc is established between the electrode and a workpiece. For example, according to one typical method for starting the torch, a pilot mode is first initiated by establishing an arc at a low current between the electrode and the nozzle. A flow of gas is also delivered through the nozzle during the pilot mode. The torch is then switched from the pilot mode to a transfer or working mode by transferring the arc to the workpiece so that the arc extends between the electrode and the workpiece. The current of the arc is increased for the working mode, and the flow rate or type of the gas can also be adjusted. The arc ionizes the gas, and the resulting high temperature gas can be used for cutting or other welding operations. One such torch and a start-up operation are further described in U.S. Pat. No. 5,017,752, titled "Plasma arc torch starting process having separated generated flows of non-oxidizing and oxidizing gas," issued May 21, 1991, which is assigned to the assignee of the present invention and the entirety of which is incorporated herein by reference.

A metering system supplies the gas that flows through the nozzle of the torch. One conventional metering system operates by attempting to provide a constant pressure in the gas that is delivered to the torch. That is, the metering system is disposed between a source of the gas and the torch and controls the flow of the gas from the source to the torch according to the pressure downstream of the metering system. For example, the metering system can be a mechanical pressure regulator or a proportional valve that receives a feedback signal indicative of the pressure of the gas flowing from the metering system to the torch. Constant pressure metering systems typically provide quick response. That is, the pressure can be changed relatively quickly at start-up or otherwise as desired. However, the flow rate provided by a constant pressure metering system can vary, thereby affecting the performance of the torch and possibly increasing wear on the components of the torch.

Another conventional metering system is configured to provide a constant flow rate of the gas to the torch. For example, a constant flow rate metering system can include a throttle valve for controlling the flow of the gas from the gas source to the torch. If the throttle valve receives the gas at a constant upstream pressure from the gas source, and the downstream pressure is sufficiently less than the upstream pressure, the flow through the throttle valve will be constant. Constant flow metering can also be achieved by providing a constant upstream pressure through a proportional valve or a fixed orifice. A bank of selectable orifices can be provided so that different flow rates can be achieved during different modes of operation of the torch. Alternatively, a fixed orifice can selectively receive different upstream pressures according to the desired flow rate. In any case, constant flow metering generally provides consistent torch performance, and can also provide optimum life of the torch components. However, the time required to stabilize a system with constant flow can be considerable. That is, although the flow rate may be constant through the metering system, the flow rate and pressure downstream in the torch may vary asymptotically during transient modes of operation, such as during start-up of the torch. In particular, after the metering system begins to provide a constant flow of gas, the flow path for the gas between the metering system and the torch may take 10 seconds or longer to achieve a stabilized pressure, during which time the torch may not operate efficiently.

Regardless of the type of metering system, the electrode can become eroded during operation. Erosion can be minimized, for example, by supplying a non-oxidizing gas to the torch during certain modes of operation. However, the electrode can still be eroded, especially if subjected to stress, repeated starting and stopping, or the like. In particular, the electrode can deteriorate quickly if a double arc exists, i.e., if arcs simultaneously exist between the electrode and the nozzle and between the electrode and the workpiece.

Thus, there exists a need for an improved metering system and associated method for providing gas to a torch. The system should be capable of providing the gas at a substantially constant flow rate. Additionally, the system should be capable of changing the flow rate at the torch relatively quickly, such as at start-up of the torch or during other times when it is desirable to adjust the rate of flow according to the operation of the torch. Further, the system should optionally provide detection of particular modes of operation of the torch that may be undesirable, such as the existence of double arcs.

BRIEF SUMMARY OF THE INVENTION

The present invention provides a metering system and an associated method for supplying gas to a torch, such as a plasma gas torch for cutting or other welding operations. The torch typically includes an electrode positioned in a nozzle and delivers gas through the nozzle for ionization by an electric arc during a working mode of the torch. The metering system includes a pressure regulator and a controller that is configured to selectively adjust the pressure regulator according to a flow rate and a pressure of the gas delivered to the torch. Thus, the pressure regulator can be adjusted to quickly achieve a predetermined downstream pressure and also to accurately achieve and maintain a predetermined flow rate.

According to one embodiment of the present invention, the metering system includes a flow rate transducer, such as a mass flow rate meter, and a pressure transducer. The flow rate transducer is configured to measure a flow of the gas and provide a flow signal indicative of the flow rate of the gas to the torch. The pressure transducer is configured to receive the flow of the gas and indicate the pressure of the gas. A controller communicates with the flow rate transducer and the pressure transducer and adjusts the pressure regulator accordingly. For example, the controller can be configured to operate selectively in first and second modes. In the first mode, the controller adjusts the pressure regulator to provide a predetermined downstream pressure. In the second mode, the controller adjusts the pressure regulator according to the flow rate of the gas to the torch, e.g., to maintain a predetermined flow rate. The controller can receive electrical signals from the flow rate transducer and/or the pressure transducer and control the pressure regulator via a pressure signal or other fluid signal.

The system can also be configured to detect a geometric aspect or change in geometry of the torch by monitoring the flow of the gas through the torch. For example, the controller can be configured to compare the flow signal and the pressure of the flow to at least one predetermined value and thereby detect a change in the geometry of the flow path of the torch. Thus, the controller can detect an enlarged or restricted nozzle of the torch by detecting a flow rate therethrough that is higher or lower than a predetermined value for a particular operating pressure. In some cases, the controller can respond to a change in the geometry of the torch by interrupting operation of the torch.

The present invention also provides a method of supplying a gas to a plasma torch. According to one embodiment, the method includes measuring a flow rate, such as a mass flow rate, and pressure of the gas flowing to the torch. A pressure regulator is adjusted according to the pressure of the gas supplied to the torch to substantially supply at least one predetermined pressure. In addition, the pressure regulator is adjusted according to the flow rate of the gas to provide a substantially steady flow rate of the gas to the torch. For example, a first predetermined pressure can be provided during starting of the torch, and a second predetermined pressure, which can be higher or lower than the first predetermined pressure, can be provided after an arc is established in the torch. Thereafter, the pressure regulator can be adjusted according to the flow rate to maintain a steady flow rate.

In addition, a geometric aspect of the torch can be detected by comparing the flow rate and the pressure of the flow to at least one predetermined value. For example, an enlarged nozzle orifice can be detected if the flow rate through the torch is larger than the predetermined value for a particular pressure in the torch or if the pressure of the gas flowing through the torch is less than a predetermined value. A double arc detection signal can be issued in response to detection of such enlargement, and/or an operation of the torch can be automatically interrupted.

BRIEF DESCRIPTION OF THE SEVERAL VIEWS OF THE DRAWING(S)

Figure 2:
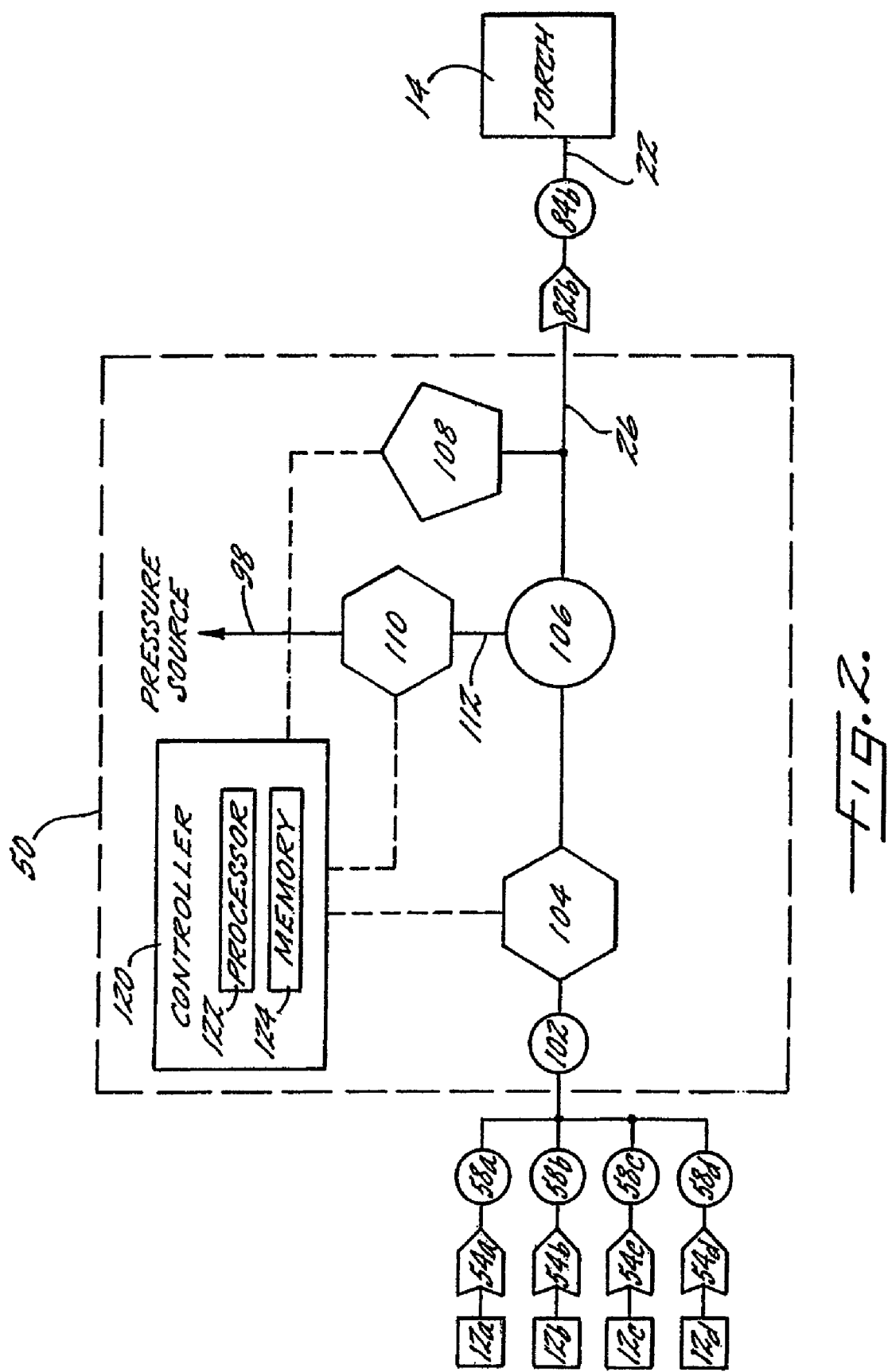

Having thus described the invention in general terms, reference will now be made to the accompanying drawings, which are not necessarily drawn to scale, and wherein:

FIG. 1 is a schematic diagram illustrating a plasma arc cutting apparatus including a metering system for a torch according to one embodiment of the present invention; and FIG. 2 is a schematic diagram illustrating a metering system according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the drawings, and in particular to FIG. 1, there is schematically illustrated a plasma arc cutting apparatus 10 including a metering system 50 according to one embodiment of the present invention. The metering system 50 controls the flow of one or more gases that flow from gas sources 12a-12f to a torch 14. Typically, the torch 14 is a plasma arc torch, which can be used for cutting or other welding operations. Generally, the torch 14 includes an electrode 16 positioned in a nozzle 18. An arc can be established between the electrode 16 and a workpiece 20 (or between the electrode 16 and the nozzle 18, such as during the pilot mode), and a flow of gas is provided through the nozzle 18 to be ionized by the arc during the cutting process. The flow of gas to be ionized during operation of the torch 14 is received by the torch 14 via a plasma gas inlet 22 that is fluidly connected to the metering system 50. In addition, the torch 14 defines a shield gas inlet 24 configured to receive a shield gas that is circulated in the torch 14 in a flow path adjacent to the electrode 16 and generally radially outside the flow of plasma gas. The structure and operation of plasma arc torches are further described in U.S. Pat. No. 6,215,090, titled "Plasma arc torch," issued Apr.10, 2001 and U.S. application Ser. No. 10/294,968, titled "Plasma Arc Torch and Method of Operation," filed Nov. 14, 2002, each of which is assigned to the assignee of the present invention, and the entirety of each of which is incorporated herein by reference. An electrode for a plasma arc torch is described in U.S. Pat. No. 5,023,425, titled "Electrode for plasma arc torch and method of fabricating same," issued Jun. 11, 1991, the entirety of which is herein incorporated by reference. It is appreciated that the metering system 50 of the present invention can be used with a variety of torches and can be used to control various types of gases.

Multiple gases can be supplied to the torch 14 for different uses in the torch 14 or during the different operations of the torch 14. For example, as shown in FIG. 1, while the metering system 50 is configured to meter a flow of plasma gas for a cutting operation through a cut plasma gas line 26, the system 50 can also supply a start plasma gas through a start plasma gas line 28, a cut shield gas through a cut shield gas line 30, a start shield gas through a start shield gas line 32, and an air curtain gas from an air source via air line 34. The flow of air through air line 34 can be provided by an air source 36 and controlled by a solenoid 38. In some cases, a flow of water is supplied to the start shield gas line 32 instead of the shield gas. The water can be supplied from a water supply source 40 via a water pump 42, which includes a pump 44, a solenoid 46 and a flow transducer 48. A check valve 49 can be provided between the source 40 and the start shield gas line 32.

Each gas supplied for the cutting or other operation can be a mixture comprised of multiple component gases, which can be selected according to the type and operation of the torch 14. For example, as shown in FIG. 1, the gases delivered to the torch 14 can be delivered as a mixture of oxygen, hydrogen, methane, nitrogen, argon, and air, each of which is supplied by a respective gas source 12a-12f. Each of the sources 12a-12f can be a pressure vessel or other device for supplying the respective gas. Further, each source 12a-12f can supply the respective gas at a predetermined and constant pressure. In this regard, each source 12a-12f can include a pressure regulator or pressure adjustment device for limiting or otherwise controlling the pressure of the gas supplied to the metering system 50.

The plasma and shield gases used in the torch 14 generally flow from the gas sources 12a-12f, through the gas metering system 50, to a torch manifold 80, and therethrough to the torch 14. The metering system 50 includes an inlet manifold 52, which includes a number of check valves 54a-54f and solenoids 56a-56f, 58a-58d, 59a-59b for controlling the direction of flow and for starting and stopping the flow from the sources 12a-12f. That is, each gas entering the inlet manifold 52 flows through the respective check valve 54a-54f to the respective solenoid(s) 56a-56f, 58a-58d, 59a. Multiple solenoids can be provided for each gas to separately control the flow of the gas through the gas lines 26, 28, 30, 32 to the torch 14. For example, the solenoids 56d, 58d control the flow of the oxygen from oxygen source 12d. By opening and closing the solenoid 56d, a flow of the oxygen to a mix regulator 60 can be controlled. A flow of the oxygen to the cut plasma gas line 26 can separately be controlled by opening and closing the solenoid 58d. Similarly, solenoids 56e, 56f control the flow of the hydrogen and methane to the mix regulator 60, respectively, and solenoids 56a-56c, 58a-58c separately control the flows of nitrogen, argon, and air to a shield regulator 62 and the cut plasma gas line 26, respectively. Solenoid 59a controls the flow of nitrogen to the start plasma gas line 28, and solenoid 59b selects the gas selected as the cut plasma gas for the start plasma gas line 28. Filters 64a, 64b can be provided throughout the metering system 50, and pressure transducers 66a, 66b can be provided for detecting the pressure of the gases in different portions of the system 50. For example, the pressure transducers 66a, 66b can detect the pressure of the gases entering the mix regulator 60 and the shield regulator 62, and the pressure transducers 66a, 66b can display the pressures to an operator and/or monitor the pressures to warn an operator or interrupt an operation of the apparatus 10 if the pressures fall below a minimum value or exceed a maximum value.

The mix and shield regulators 60, 62 can be flow regulation devices that are configured to maintain a substantially constant flow rate therethrough. For example, each regulator 60, 62 can include a plurality of parallel orifices that are selectively disposed in the path of flow according to the desired flow rate. From the regulators 60, 62, the gases flow to a check valve and solenoid manifold 70, i.e., an arrangement of solenoids 72a-72c and check valves 74a-74d configured to control the flow of the gases to the torch manifold 80. Thus, the mix regulator 60 acts as a shield regulator when the solenoid 72b is open. The torch manifold 80, in turn, includes check valves 82a-82c and solenoids 84a-84d for selectively connecting the cut plasma gas line 26 and start plasma gas line 28 to the plasma gas inlet 22 of the torch 14 and for selectively connecting the cut shield gas line 30 and start shield gas line 32 to the shield gas inlet 24.

Therefore, the supply of the plasma gas to the plasma gas inlet 22 of the torch 14 is provided via the cut plasma gas line 26 and the start plasma gas line 28. In particular, solenoid 59a can be selectively opened and closed to control the flow of nitrogen to the start plasma gas line 28. The nitrogen flows from the solenoid 59a to a pressure regulator 90, which can be adjusted according to a pressure downstream of the regulator 90. That is, the pressure regulator 90 can be a valve, such as a proportional valve, or another device and can include a pressure feedback loop that is internal or external to the pressure regulator 90. For example, a pressure setting device 92 can be configured to receive an electrical pressure signal from a pressure transducer 94 indicative of the downstream pressure at the transducer 94. The pressure transducer 94 can be a pressure gauging device configured to measure a pressure and provide an electrical signal indicative of the measured pressure. The pressure setting device 92 can adjust the pressure regulator 90 accordingly, e.g., by opening or closing the regulator 90 in response to the measured pressure to achieve a predetermined pressure at the pressure transducer 94. For example, the pressure setting device 92 can be an electromechanical device such as an electronically controlled pressure setting device that receives an electric pressure signal from the pressure transducer 94 or a controller and adjusts the pressure regulator 90 by adjusting a fluid control pressure delivered through a control line 96 to the pressure regulator 90. The control pressure can be provided by one of the pressure sources, such as the nitrogen source 12a through pressure supply line 98 as shown in FIG. 1. The gas flows from the pressure regulator 90 via the check valve 82a in the torch manifold 80 to the plasma gas inlet 22 of the torch 14. The solenoid 84a in the torch manifold 80 can also be used to selectively vent some or all of the gas flowing through the start plasma gas line 28.

Gases flowing to the cut plasma gas line 26, such as nitrogen, argon, air, and oxygen, can be supplied through the respective solenoids 58a-58d. Some or all of the gas flowing through the solenoids 58a-58d can be directed through the solenoid 59b to the start plasma gas line 28 so that the start plasma gas can be the same as the cut plasma gas. Otherwise, the gas flows to a pressure switch 100 and a fixed pressure regulator 102, which can be configured to provide a predetermined pressure, such as about 100 psi. Thereafter, the gas is directed through a mass flow transducer 104, through an adjustable pressure regulator 106, and to a pressure transducer 108. Similar to the pressure regulator 90 in the start plasma gas line 28, the pressure regulator 106 can be adjusted by a pressure setting device 110. That is, the pressure setting device 110 can be configured to receive a pressure signal from the pressure transducer 108 indicative of the downstream pressure in the cut plasma gas line 26 and adjust the pressure regulator 106 accordingly, e.g., by controlling a control pressure in a control line 112. Thus, the pressure setting device 110 and the pressure regulator 106 can maintain a predetermined pressure in the cut plasma gas line 26, substantially regardless of flow variations in the torch 14 that might otherwise affect the pressure in the cut plasma gas line 26. The cut plasma gas line 26 can also be configured to receive a flow of gas from the check valve and solenoid manifold 70, i.e., via the solenoid 72a and check valve 74a. A "T" fitting 142 or fluid chamber is provided in the cut plasma gas line 26 so that the gases entering the line 26 are mixed therein. The check valve 82b and solenoid 84b in the torch manifold 80 control the delivery of the gas into the plasma gas inlet 22 of the torch 14.

The pressure regulator 106 can be responsive to the mass flow rate transducer 104 in addition to the downstream pressure transducer 108. In this regard, there is illustrated in FIG. 2 a controller 120 configured to communicate with the pressure transducer 108 and the mass flow rate transducer 104 and control the pressure regulator 106 accordingly. The controller 120 can include a processor 122 that operates according to predetermined operating instructions, such as programmable software code stored in a memory 124. In particular, the mass flow rate transducer 104 can be configured to measure a mass flow rate of the gas flowing therethrough, and the pressure transducer 108 can be configured to detect the pressure of the gas flowing downstream of the pressure regulator 106. The mass flow rate transducer 104 can be an electromechanical device that generates an electrical flow signal that is proportional to the mass flow rate. For example, the mass flow rate transducer 104 can measure the electrical characteristics of a conductive wire disposed in the flow path of the cut plasma gas line 26 and provide an electrical flow signal based thereon. While the mass flow transducer 104 is illustrated as receiving all of the gas flowing through the cut plasma gas line 26, the mass flow transducer 104 can instead be configured to measure the flow rate by monitoring only a portion of the gas flowing through the line 26, and in some cases, the mass flow transducer 104 does not receive the gas or receives only a portion of the gas being measured. Further, while the mass flow transducer 104 is illustrated as being upstream of the pressure regulator 106 in FIG. 2, it is appreciated that the mass flow transducer 104 can be positioned elsewhere in the apparatus 10, such as downstream of the pressure regulator 106. The mass flow rate transducer 104 and the pressure transducer 108 can communicate signals indicative of the mass flow rate and the downstream pressure to the controller 120. The controller 120, in turn, can receive the signals from the mass flow rate transducer 104 and the pressure transducer 108 and respond by adjusting the pressure setting device 110, which accordingly adjusts pressure regulator 106.

The controller 120 can be configured to operate in multiple modes of operation. In each mode, the controller 120 can control the pressure regulator 106 by adjusting the pressure setting device 110. That is, the controller 120 need not communicate directly with the pressure regulator 106 to control the regulator 106. In a first exemplary mode of operation, the controller 120 can adjust the pressure regulator 106 according to the pressure transducer 108. In a second mode of operation, the controller 120 can adjust the pressure regulator 106 according to the mass flow rate transducer 104. In particular, in the first mode, the controller 120 can be programmed to regulate the pressure regulator 106 to achieve a predetermined downstream target pressure at the pressure transducer 108. The controller 120 can generally do so by opening the pressure regulator 106 if the downstream pressure is lower than the target pressure and closing the pressure regulator 106 if the downstream pressure is greater than the target pressure. The controller 120 can adjust the pressure regulator 106 to varying degrees according to the difference between the target pressure and the downstream pressure or according to a characteristic of either of those pressures, such as the rate of change of the pressures. Further, in some cases, the controller 120 can adjust the pressure regulator 106 according to predetermined parameters for achieving a particular pressure. For example, the controller 120 can be programmed with an adjustment setting for the pressure regulator 106 that corresponds to a predetermined target pressure. Thus, when adjusting the pressure regulator 106 to achieve and maintain the programmed target pressure, the controller 120 can adjust the pressure regulator 106 to the programmed setting and, optionally, perform additional adjustment to the pressure regulator 106 thereafter.

In addition, the controller 120 can adjust the pressure regulator 106 to achieve different target pressures according to the operation of the torch 14. For example, during starting of the torch 14, the controller 120 can first adjust the pressure regulator 106 to achieve a first steady state pressure that is associated with a flow rate that has been previously determined to be appropriate for starting of the torch 14. Then, after the arc is established, the controller 120 can adjust the pressure regulator 106 to achieve a second pressure that is associated with a flow rate that is appropriate for operating the torch 14 in a cutting mode. For example, the flow of gas through the plasma chamber can be affected by the temperature of the gas in the plasma chamber when the arc is initiated, which in turn affects the pressure of the gas necessary upstream of the plasma chamber to achieve a certain flow rate. The required pressures for achieving particular rates of flow can be determined theoretically or empirically and stored in the memory 124. In this way, the controller 120 can adjust the pressure regulator 106 to quickly achieve a substantially steady downstream pressure that corresponds to a flow rate appropriate for each operating mode of the torch 14. Even if the flow path of the gas downstream of the pressure regulator 106 defines a large volume, e.g., if a long gas hose is disposed between the pressure regulator 106 and the torch 14, the controller 120 can quickly achieve an appropriate flow rate at the torch 14 by adjusting the pressure regulator 106 according to the downstream pressure. Thus, the controller 120 can quickly achieve a substantially steady state operation.

In the second mode of operation, the controller 120 can instead adjust the pressure regulator 106 according to the mass flow rate as measured by the mass flow rate transducer 104. That is, the controller 120 can receive the signal from the mass flow rate transducer 104 indicative of the mass flow rate therethrough and adjust the pressure regulator 106 to increase or decrease the flow rate in order to achieve a target flow rate. For example, after the arc is established and the controller 120 has adjusted the pressure regulator to substantially achieve a target downstream pressure, the controller 120 can automatically enter the second mode of operation and begin adjusting the pressure regulator 106, e.g., "fine tuning" the pressure regulator 106 to substantially achieve the target flow rate. Although adjustment of the pressure regulator 106 according to the flow rate can be slower to achieve steady state operation, adjustment according to the flow rate can be used after a substantially steady state is achieved to thereafter more accurately provide a steady flow rate of the gas to the torch 14. An accurately controlled flow rate of gasses is considered to be important for achieving improved steady-state torch operation and life. Thus, after an appropriate flow rate is substantially achieved according to the downstream pressure in the first mode, the metering system 50 can thereafter continue to fine tune the flow rate to achieve and maintain a substantially steady flow rate during operation of the torch 14.

The metering system 50 can be operated in successive modes of operation during any transient state of operation of the apparatus 10. That is, the metering system can quickly achieve and maintain a desired rate of flow at any time during the operation of the torch by first adjusting the pressure regulator 106 according to the downstream pressure and then according to the flow rate. Transient states of operations can occur at start-up, shut-down, or upon any structural or operational change of the torch, gas sources 12a-12f, and the like. Further, while the controller 120 of FIG. 2 is illustrated as being configured for controlling the flow of the gas through the plasma cut gas line 26, it is appreciated that a controller 120 can alternatively, or additionally, be provided for controlling the plasma start gas, the shield gas, the water from supply source 40, or other fluids to be used with the torch 14 or otherwise.

In one embodiment of the present invention, changes in the flow of the gas through the torch 14 can be detected by monitoring changes in the pressure measured by the pressure transducer 108 or mass flow rate transducer 104. For example, after the arc is established for a cutting operation with the torch 14, the controller 120 can be configured to continuously adjust the pressure regulator 106 according to the mass flow rate measured by the mass flow rate transducer 104, as described above. In addition, the controller 120 can continuously mass flow rate, the downstream pressure at the pressure transducer 108, and/or the relationship of the mass flow rate of the gas to the torch 14 to the downstream pressure. For example, the controller 120 can compare the relationship between the mass flow rate and the downstream pressure to a predetermined relationship for a particular type of torch and nozzle and the particular operating parameters. The relationship can correspond to a geometric aspect of the torch 14, such as the size of the orifice of the nozzle 18. Thus, if the controller 120 detects an unexpected relationship between the mass flow rate and downstream pressure, the controller 120 can signal the operator with a warning light, sound, or the like. Alternatively, the controller 120 can automatically interrupt or terminate an operation of the torch 14, e.g., by terminating the arc and/or adjusting the gas flow.

In particular, the controller 120 can detect a change in the geometry of the torch 14, such as a change in the geometry of the nozzle 18 due to erosion or deterioration of the nozzle 18. For example, significant erosion of the nozzle 18 can be indicative of the occurrence of double arcing in the torch 14. That is, if arcs simultaneously occur between the electrode 16 and the nozzle 18 and between the electrode 16 and the workpiece 20 during operation of the torch 14, the nozzle 18 can be quickly eroded, thereby enlarging the orifice of the nozzle 18. Such enlargement of the nozzle orifice by double arcing, nicking or other damage to the nozzle 18, and the like can result in a higher than expected flow through the nozzle 18 for the same or lower pressures of gases delivered to the torch 14. Alternatively, a lower than expected flow for the same or higher pressure can indicate that the nozzle 18 is at least partially blocked, e.g., by debris disposed in the nozzle 18. Thus, a higher than expected flow for a particular pressure can indicate enlargement of the nozzle 18, while lower flow for a particular pressure can indicate blockage. Thus, by monitoring the mass flow rate and the downstream pressure, and comparing the relationship between the flow rate and pressure to expected values therefor, the controller 120 can accurately detect the occurrence of double arcing or other undesirable conditions occurring in the torch 14. In some cases, the detection by the controller 120 of double arcs or other problems can occur only after the nozzle 18 has been substantially affected. Nevertheless, such monitoring can prevent further damage from occurring to the apparatus 10 after the nozzle 18 is damaged.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A metering system for supplying a gas to a plasma torch, the system comprising:
   a flow rate transducer configured to provide a flow signal indicative of a flow rate of the gas flowing to the torch;
   a pressure regulator in a series configuration with the flow rate transducer, the pressure regulator being configured to receive the flow of the gas and control a pressure of the gas flowing to the torch; and
   a controller configured to communicate with the flow rate transducer and the pressure regulator to thereby receive the flow signal from the flow rate transducer and detect a pressure of the gas flowing from the pressure regulator to the torch,
   wherein the controller is configured to operate selectively in first and second modes, the controller in the first mode being configured to adjust the pressure regulator according to the pressure of the gas flowing to the torch, and the controller in the second mode being configured to adjust the pressure regulator according to the flow rate of the gas to the torch.

2. A system according to claim 1 wherein in the first mode the controller is configured to adjust the pressure regulator to provide a predetermined pressure in the flow of the gas to the torch.

3. A system according to claim 1 wherein the flow rate transducer is configured to provide the flow signal indicative of the mass flow rate of the flow of the gas to the torch, and wherein in the second mode the controller is configured to adjust the pressure regulator to provide a substantially constant mass flow rate of the gas to the torch.

4. A system according to claim 1 further comprising a pressure transducer in fluid communication with the flow of the gas from the pressure regulator and configured to indicate the pressure of the gas to the controller.

5. A system according to claim 4 wherein the pressure regulator is configured to receive the gas from the flow rate transducer and deliver the gas to the torch.

6. A system according to claim 1 further comprising a pressure setting device configured to receive an electrical signal from the controller and provide a corresponding fluid signal to the pressure regulator to adjust the pressure regulator.

7. A system according to claim 1 wherein the controller is configured to detect a change in the flow of the gas indicative of a change in the geometry of the torch.

8. A system according to claim 1 wherein the pressure regulator is a proportional valve with a pressure feedback loop.

9. A method of supplying a gas to a plasma torch, the method comprising:
   measuring, by a flow rate transducer, a flow rate of the gas flowing to the torch and providing a flow signal indicative of the flow rate;
   measuring the pressure of the gas flowing to the torch;
   providing a pressure regulator in a series configuration with the flow rate transducer, the pressure regulator being configured to receive the flow of the gas and control a pressure of the gas flowing to the torch;
   adjusting the pressure regulator according to the pressure of the gas supplied to the torch to substantially supply at least one predetermined pressure; and
   adjusting the pressure regulator according to the flow signal to substantially supply at least one predetermined flow rate of the gas to the torch.

10. A method according to claim 9 wherein said first measuring step comprises measuring the mass flow rate of the gas flowing to the torch.

11. A method according to claim 9 wherein said adjusting steps comprise controlling the pressure regulator with a controller configured to detect the mass flow rate and the pressure of the gas supplied to the torch.

12. A method according to claim 9 wherein said adjusting steps comprise communicating an electric signal to control the pressure regulator.

13. A method according to claim 12 wherein said adjusting steps comprise communicating the electric signal to a pressure setting device such that the pressure setting device provides a corresponding fluid signal to the pressure regulator for adjusting the pressure regulator.

14. A method according to claim 9 wherein said first adjusting step comprises providing a first predetermined pressure during starting of the torch, and providing a second predetermined pressure after an arc is established in the torch, the second predetermined pressure being different than the first predetermined pressure, and wherein said second adjusting step comprises controlling the pressure regulator after said first adjusting step.

15. A method according to claim 14, further comprising determining at least one of the first and second predetermined pressures according to a desired flow rate of the gas through the torch.

16. A method according to claim 9, further comprising detecting a change in a flow of the gas indicative of a change in the geometry of the torch and responding to the change by issuing a double arc detection signal.

17. A method according to claim 16, further comprising automatically interrupting an operation of the torch upon detection of the change in the flow of the gas.

* * * * *

UNITED STATES PATENT AND TRADEMARK OFFICE
CERTIFICATE OF CORRECTION

PATENT NO. : 7,605,341 B2 Page 1 of 1
APPLICATION NO. : 11/423237
DATED : October 20, 2009
INVENTOR(S) : Higgins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 538 days.

Signed and Sealed this

Fifth Day of October, 2010

David J. Kappos
*Director of the United States Patent and Trademark Office*